United States Patent [19]

Nakahara et al.

[11] 3,761,511

[45] Sept. 25, 1973

[54] PROCESS FOR POLYMERIZING ε-CAPROLACTONES

[75] Inventors: Yasuji Nakahara; Kiyoshi Ichikawa; Kaoru Osonoi, all of Fuji, Japan

[73] Assignee: Asahi Kasei Kogyo Kabushiki Kaisha, Osaka, Japan

[22] Filed: Aug. 6, 1970

[21] Appl. No.: 61,811

[52] U.S. Cl........ 260/482 B, 57/140 R, 260/77.5 B, 260/77.5
[51] Int. Cl.......................................... C07c 125/06
[58] Field of Search ..................... 260/482 B, 482 R

[56] References Cited
UNITED STATES PATENTS
3,558,573   1/1971   Wirth et al...................... 260/484 A Primary Examiner—Lorraine A. Weinberger
Assistant Examiner—Paul J. Killos
Attorney—Flynn and Frishauf

[57] ABSTRACT

Process for preparing poly-ε-caprolactones which comprises heating ε-caprolactones using hydrazine as the polymerization initiator at a temperature between the melting point of ε-caprolactones and about 35° C. at the first step of polymerization and subsequently at a temperature from 120° to 250° C. at the second step of polymerization until polymerization of the ε-caprolactones is completed.

8 Claims, No Drawings

નૃ3,761,511

PROCESS FOR POLYMERIZING ε-CAPROLACTONES

BACKGROUND OF THE INVENTION

1. Field of the Invention

This invention relates to a novel process for polymerizing ε-caprolactones. More particularly, it is concerned with a process for preparing poly-ε-caprolactones which comprises heating ε-caprolactones using hydrazine as the polymerization initiator at a temperature between the melting point of ε-caprolactones and about 35° C. at the first step of polymerization and then at a temperature from 120° to 250° C. at the second step of polymerization until polymerization of the ε-caprolactones is completed.

2. Description of the Prior Art

In the prior art processes for polymerizing ε-caprolactones the process involving the use of an organic compound having at least one hydroxyl or amino group as the polymerization initiator and heating in the presence or absence of a catalyst has been employed.

SUMMARY OF THE INVENTION

As a result of extensive studies on the process for polymerizing ε-caprolactones we have discovered that hydrazine can be employed as the polymerization initiator. In the process for polymerizing ε-caprolactones according to this invention there is used anhydrous or hydrated hydrazine as the polymerization initiator. The polymerization reaction is effected, if necessary, in the presence of an inert solvent which can be azeotropically distilled out with water, at a temperature below the melting point of ε-caprolactones and about 35° C. at the initial step of polymerization, and subsequently, when hydrated hydrazine is used as the polymerization initiator, at a temperature below 80° C. while azeotropically separating the water in the system with the solvent, if necessary, under reduced pressure, and finally at a temperature from 120° to 250° C., preferably from 120° to 200° C. to substantially complete the polymerization reaction.

The polymers obtained by the process of this invention are believed to be polymers mainly composed of a linear polyester structure with terminal hydroxyl groups and containing -CONHNHCO- groups in the main chain. The polyurethane materials, for example, polyurethane elastic fibers, derived from the poly-ε-caprolactones thus obtained have now been found to have especially high instantaneous recovery as well as remarkably increased resistance to industrial smog and combustion gas.

In the process of this invention may be used hydrazine which contains 0 to 20 molecules of water per molecule of hydrazine. Hydrazine containing water from 0.3 to 20 moles per mole of hydrazine are advantageous, because it is highly stable during storage and available inexpensively. However, if hydrazine containing more than one mole of water per mole of hydrazine is used, it is necessary to remove the water at a temperature below 80° C. by azeotropic distillation with the solvent, if necessary, under reduced pressure following the initial reaction conducted at a temperature below 35° C. Such a procedure is not needed when anhydrous hydrazine or hydrazine with a lower water content is used. On the other hand, hydrazine containing more than 20 moles of water per mole of hydrazine will be disadvantageous because of great difficulty caused in the azeotropically dehydrating step.

Whereas the use of solvent is not always necessary in using anhydrous hydrazine, it is desirous in the use of hydrated hydrazine to carry out the reaction in the presence of an inert solvent which can be azeotropically distilled with water, and preferably, boils at a temperature below 130° C. The inert solvent may include, for example, benzene, toluene, nitromethane, 1,2-dimethoxyethane, 1,2-diethoxyethane and pyridine.

The amount of hydrazine used in the process of this invention, which affects the molecular weight of poly-ε-caprolactones formed, is preferably from 4 to 30 mol percent based on the ε-caprolactone employed.

According to the present invention, it is necessary to carry out the polymerization reaction at two steps of temperature, in addition to the use of hydrazine as the polymerization initiator as set forth above. At the initial step of polymerization it is carried out at a temperature between the melting point of ε-caprolactones and about 35° C., preferably from 10° to 30° C., when no free hydrazine is observed. The reaction time is variable depending upon reaction conditions such as the reaction temperature and the amount of polymerization initiator. Then the reaction mixture is subjected to azeotropic removal of water, if necessary, and subsequently to a temperature from 120° to 250° C., preferably from 120° to 200° C. to complete the polymerization reaction. Application of higher temperatures from the early stage of the polymerization reaction or omission of the azeotropically dehydrating procedure will undesirably lead to products susceptible to color formation or with higher acid value, and consequently there will occur phenomena such as gellations during the production of polyurethane materials starting with the product.

As the ε-caprolactones used in the process of this invention are mentioned ε-caprolactone and ε-caprolactones substituted by a lower alkyl group such as methyl or ethyl group at the α, β, γ, δ or ε positions. The caprolactone as mentioned above may be homopolymerized alone or copolymerized with one or more components. The molecular weight of the polymer produced according to the process of this invention is usually from about 400 to about 3,000.

Polymers of ε-caprolactones obtained according to the process of this invention are valuable as intermediates for polyurethane elastomer, foamed products, adhesives, coating compositions and especially for elastic fibers.

DESCRIPTION OF PREFERRED EMBODIMENTS

The invention will be described in greater detail in conjunction with the following specific examples.

In the examples APHA was measured on the basis of the degree of coloring by the method described in "Standard Method for the Examination of Water and Sewage" vol.8, 1936, p.12. "Encyclopedia of Chemical Technology", vol.4, American Public Health Association N.Y. A standard solution taken as an APHA of 500 was prepared by dissolving 1.246 g. of potassium chloroplatinate and 1.100 g. of cobalt chloride in 100 ml. of concentrated hydrochloric acid and diluting the solution with distilled water to 1 litre. The solution was diluted in such a way that solutions prepared by 1:2, 1:5 and 1:10 dilutions of the solution were taken as APHA of 250, 100 and 50, respectively. APHA was determined by comparing the test specimen with the standard solution placed in a 50-ml. flat-bottomed test tube.

EXAMPLE 1

To 137 g. of ε-caprolactone stirred at 25° C. under nitrogen were added 3.2 g. of hydrazine. The temperature was increased to 160° C. after 30 min., at which temperature the mixture was maintained for about 16 hours. Conversion of ε-caprolactone was then nearly 100 percent. The lactone polyester thus obtained had a molecular weight of 1310, an acid value of 0.60 and an APHA value at 50° C. of 30 and was a waxy solid at room temperature.

A comparative polymerization was run by heating the ε-caprolactone and the hydrazine at 160° C. without the reaction at room temperature for 30 min. as in the above example to give a product with an equal molecular weight but with an acid value of 3.4 and being remarkably colored with an APHA value at 50° C. of 450.

To 104.8 g. of the lactone polyester obtained in Example 1 were added 36.0 g. of 4,4'-diphenylmethane-diisocyanate. The mixture was subjected to reaction at 90° C. with stirring for 60 minutes, followed by allowing to cool to room temperature. The resulting mixture was dissolved in 250 g. of N,N-dimethylacetamide and the solution was added with stirring to 150 g. of an N,N-dimethylacetamide solution containing 3.8 g. of ethylenediamine. From the solution thus obtained was produced elastic yarn by a conventional dry spinning method. Properties of the elastic yarn were as follows: Denier, 210d.; tensile strength, 0.68 g./d.; tensile elongation, 570 percent.

A comparative experiment was made to prepare elastic yarn in the same way as in the above example except that a known lactone polyester obtained by polymerizing ε-caprolactone using diethylene glycol as the polymerization initiator was employed. There are little differences in most of the properties between the two elastic yarns, but the polyurethane elastic yarn in the present example was far superior in instantaneous recovery and resistance to gas fading. The results were as follows:

|  | Instantaneous * recovery (%) | Resistance ** to gas fading (grade) |
|---|---|---|
| Elastic yarn in the present example | 19.2 | 4–5 |
| Elastic yarn in the comparative example | 56.8 | 3 |

\* Expressed in percent of the residual strain to the original length after being at 200 % elongation for 1 min. and subsequently a 100% elongation for 16 hrs. followed by being free for 10 sec. at a relative humidity of 65% and a temperature of 20°C.
\*\* Expressed in terms of the degree of coloring caused by gaseous nitrogen oxide according to JIS L 0855. The larger values show higher resistance to gas fading.

EXAMPLE 2

To a mixture of 105 g. of ε-caprolactone and 18 g. of γ-methyl-ε-caprolactone stirred at 15° C. under nitrogen were added 5.5 g. of hydrazine hydrate. The temperature was increased to 175° C. after 45 min., at which temperature the mixture was maintained for 12 hrs. The resulting mixture was then treated at 120° C. under a reduced pressure of 2 mm.Hg to remove a small amount of volatile matters. The lactone polyester thus obtained had a molecular weight of 970, an acid value of 1.8 and an APHA value at 50° C. of 25 and was a waxy solid at room temperature.

EXAMPLE 3

To a mixture of 125.4 g. of ε-caprolactone and 80 g. of toluene at 25° C. were added 6.2 g. of 80 percent hydrazine hydrate (corresponding to a molar ratio of water to hydrazine of 1.69). After 30 min. a small amount of water present in the reaction system was removed by azeotropical distillation under reduced pressure together with about 80 percent of the toluene. Then the mixture was maintained at 140° C. under normal pressure for about 18 hrs., followed by treatment under a pressure of 2 mm.Hg, thereby removing a small amount of volatile materials. The poly-ε-caprolactone thus obtained had a molecular weight of 1240, an acid value of 0.4 and an APHA value at 50° C. of 30 and was a waxy solid at room temperature.

For a comparative experiment the same procedure as in the above example was repeated except that toluene was not used and accordingly azeotropic separation of water was not applied. The product, though being of a similar molecular weight, had an acid value of 3.9 being far higher than in the above example. Attempts to prepare a starting solution for polyurethane elastic yarn using the polycaprolactonediol of such a high acid value failed due to its susceptibility to gel formation.

EXAMPLE 4

The same procedure as in Example 3 was repeated except that 1,2-diethoxyethane was used in place of the toluene. Conversion of ε-caprolactone was nearly 100 percent. The poly-ε-caprolactone thus obtained had a molecular weight of 1250, an acid value of 0.55 and an APHA value at 50° C. of 30 and was a waxy solid at room temperature.

EXAMPLE 5

To a mixture of 102.6 g. of ε-caprolactone, 12.8 g. of γ-methyl-ε-caprolactone and 100 g. of pyridine stirred at 15° C. under nitrogen were added 5.0 g. of hydrazine hydrate. After 30 min. the mixture was treated at 75° C. under reduced pressure, thereby the water in the reaction system being azeotropically removed together with almost all of the pyridine. Then the resulting mixture was maintained at 180° C. under normal pressure for about 14 hrs. Conversion of ε-caprolactone was nearly 100 percent. The poly-ε-caprolactone thus obtained was a waxy solid at a room temperature which had a molecular weight of 1085, an acid value of 0.3 and an APHA value at 50° C. of 50.

EXAMPLE 6

A polymerization was run by mixing 128 g. of ε-methyl-ε-caprolactone and 2.49 g. of hydrated hydrazine containing 0.3 moles of water per mole of hydrazine under nitrogen at 3° C. and continuing the stirring under these conditions for 5 hrs., the mixture becoming more and more viscous. The temperature was then increased to 140° C., at which temperature the mixture was stirred for about 16 hrs. Conversion of the caprolactone was nearly 100 percent. The poly-β-methyl-ε-caprolactone thus obtained was a white waxy solid at room temperature, which had a molecular weight of 1950, an acid value of 0.80 and an APHA value in molten state at 50° C. of 40.

EXAMPLE 7

A polymerization was run of a mixture of 114 g. of ε-caprolactone, 128 g. of β-methyl-ε-caprolactone and 130 g. of nitromethane using hydrated hydrazine containing about 20 moles of water per mole of hydrazine as the polymerization initiator and at 30° C. for 2 hrs. at the initial stage and subsequently at 70° C. under reduced pressure for azeotropic removal of water. When most of the nitromethane was distilled off, the temperature of the reaction system was increased to 180° C. The temperature was up to 200° C. for a while owing to the heat of reaction and then down to 180° C. in 2 hrs. Stirring was continued under the conditions for 15 hrs. to produce a slightly yellowish polymer. The polymer had a molecular weight of 1190, an acid value of 2.10 and an APHA value at 50° C. of 100.

A 80:20 mixture of 2,4-tolylene diisocyanate and 2,6-tolylene diisocyanate was reacted with the copolyester obtained as above and using methylene-bis-orthochloraniline as the chain extender. The elastomer thus produced had a Shore A hardness of 90 and was very elastic.

EXAMPLE 8

A mixture of 114 g. of ε-caprolactone, 64 g. of α-methyl-ε-caprolactone, 12.2 g. of hydrated hydrazine containing 5 moles of water per mole of hydrazine as a polymerization initiator and 50 g. of toluene was maintained at 10° C. There was precipitated a white paraffin-like solid in 1.5 hrs. The temperature was then increased to 70° C. to remove the toluene and all of the water by azeotropic distillation under a reduced pressure. The temperature of the reaction system was further increased to 180° C. at which temperature stirring was continued for 10 hrs. Almost all monomer was removed from the resulting copolyester at 120° C. under a reduced pressure of 1 mm.Hg. A polymer which had a molecular weight of 1750, an acid value of 1.00 and an APHA value at 50° C. of 50.

EXAMPLE 9

To 128 g. of ε-methyl-ε-caprolactone stirred at 20° C. under nitrogen were added 50 g. of benzene and 21.5 g. of hydrated hydrazine containing 3 moles of water per mole of hydrazine. The mixture was stirred for 1 hr. The temperature was then increased to 70° C. to remove all of the water by azeotropic distillation. About 90 percent of the benzene was also distilled off. The temperature was further increased to 120° C. and stirring at that temperature was continued for 24 hrs. Conversion of the caprolactone was 100 percent. Almost all monomer was removed from the resulting polymer under a pressure of 1 mm.Hg. There was obtained poly-ε-methyl-ε-caprolactonediol, a soft waxy solid at room temperature which had a molecular weight of 510, an acid value of 0.85 and an APHA value at 50° C. of 40.

I claim:

1. Process for preparing a poly-ε-caprolactone which comprises heating a ε-caprolactone in the presence of hydrazine as a polymerization initiator at a temperature between the melting point of the ε-caprolactone and about 35° C. at a first polymerization step until the hydrazine is completely consumed and subsequently at a temperature from 120° C. to 250° C. at a second polymerization step until polymerization of the ε-caprolactone is completed.

2. Process according to claim 1 wherein the hydrazine is hydrated hydrazine, the polymerization reaction is conducted in the presence of an inert solvent which boils azeotropically with water and the water in the reaction system is azeotropically distilled off at a temperature below 80° C. at a step between the first and second steps.

3. Process according to claim 1 wherein the hydrazine is anhydrous hydrazine and the polymerization reaction is conducted in the absence of solvent.

4. Process according to claim 2 wherein the hydrazine contains 0.3–20 moles of water per mole of hydrazine.

5. Process according to claim 2 wherein the inert solvent is selected from a group consisting of benzene, toluene, nitromethane, 1,2-diethoxyethane, 1,2-diethoxymethane and pyridine.

6. Process according to claim 1 wherein the hydrazine is used in an amount from 4 to 30 mol percent of the ε-caprolactone.

7. Process according to claim 1 wherein the first step is carried out at a temperature of from 10° C. to 30° C. and the second step is carried out at a temperature of 120° C. to 200° C.

8. Process according to claim 1 wherein the ε-caprolactone is selected from the group consisting of ε-caprolactone and a ε-caprolactone having a lower alkyl group at a α, β, γ, δ or εposition.

* * * * *

UNITED STATES PATENT OFFICE
CERTIFICATE OF CORRECTION

Patent No. 3,761,511    Dated  September 25, 1973

Inventor(s) YASUJI NAKAHARA et al

It is certified that error appears in the above-identified patent and that said Letters Patent are hereby corrected as shown below:

Title page, after the Appl. No., insert:
[30] Foreign Application Priority Data

August 13, 1969   Japan..............63559/1969
September 13, 1969   Japan...........72334/1969

Column 3, line 53, after "being" insert -- kept --.

Column 6, last line, after "alkyl group at a", should read " $\alpha, \beta, \gamma, \delta$ or $\epsilon$ position."

Signed and sealed this 21st day of May 1974.

(SEAL)
Attest:

EDWARD M. FLETCHER, JR.
Attesting Officer

C. MARSHALL DANN
Commissioner of Patents